(12) United States Patent
Bariaud et al.

(10) Patent No.: US 6,328,531 B1
(45) Date of Patent: Dec. 11, 2001

(54) COOLED TURBINE BLADE

(75) Inventors: Christian Bernard Bariaud, La Ville du Bois; Eric Stéphan Bil, Chartrettes, both of (FR)

(73) Assignee: Societe Nationale d'Etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/412,759

(22) Filed: Oct. 5, 1999

(51) Int. Cl.[7] ................................................ F01D 5/18
(52) U.S. Cl. .............................................. 416/97 R
(58) Field of Search ................................ 415/115; 416/95, 416/96 R, 96 A, 97 R, 248

(56) References Cited

U.S. PATENT DOCUMENTS

| | | |
|---|---|---|
| 3,885,609 * | 5/1975 | Frei et al. .................... 416/97 R |
| 4,236,870 | 12/1980 | Hucul, Jr. et al. . |
| 4,303,374 * | 12/1981 | Braddy ......................... 416/97 R |
| 4,515,523 | 5/1985 | North et al. . |
| 5,176,499 * | 1/1993 | Damlis et al. ................. 416/97 R |
| 5,215,431 | 6/1993 | Derrien . |
| 5,243,759 | 9/1993 | Brown et al. . |
| 5,288,207 | 2/1994 | Linask . |
| 5,344,283 | 9/1994 | Magowan et al. . |
| 5,516,260 * | 5/1996 | Damlis et al. ................. 415/115 |
| 5,772,398 | 6/1998 | Noiret et al. . |
| 5,975,851 * | 11/1999 | Liang ............................ 416/97 R |

FOREIGN PATENT DOCUMENTS 0 785 339 A1    7/1997    (EP) .

* cited by examiner

*Primary Examiner*—Edward K. Look
*Assistant Examiner*—Ninh Nguyen
(74) *Attorney, Agent, or Firm*—Oblon, Spivak, McClelland, Maier & Neustadt, P.C.

(57) ABSTRACT

A cooled turbine blade comprising a platform and an aerofoil portion has a rebate formed in the aerofoil portion near the trailing edge on the pressure face side. This rebate extends from the platform to the blade tip, and slots for the escape of cooling air from an internal cavity of the aerofoil portion open into the rebate.

3 Claims, 2 Drawing Sheets

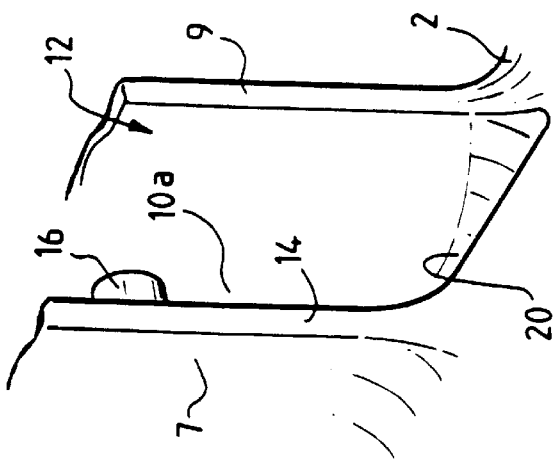
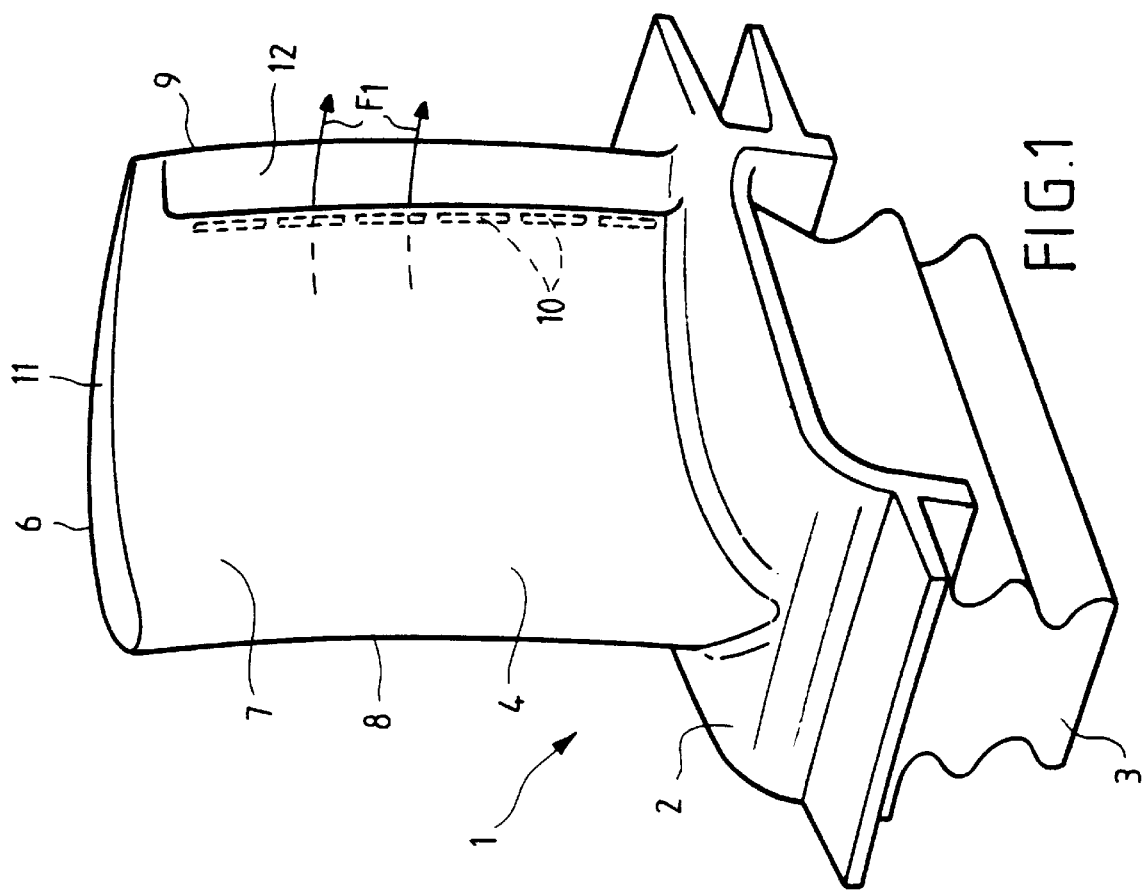

COOLED TURBINE BLADE

BACKGROUND OF THE INVENTION

1. Field of the Invention

The invention relates to a cooled turbine blade comprising a platform and an aerofoil portion having a suction face and a pressure face extending between leading and trailing edges, and a number of slots opening adjacent the trailing edge on the pressure face side for the escape of cooling air flowing through an internal cavity of said aerofoil portion. Such cooled blades are used, in particular, in turbine blading which is subjected to high temperatures.

2. Summary of the Prior Art

Conventionally, the slots adjacent the trailing edge of cooled turbine blades open into recesses which are formed near the trailing edge on the pressure face side and which are separated by stiffeners which locally constitute the aerodynamic profile of the aerofoil near the trailing edge. European Patent No. 0785339 discloses an arrangement of this kind.

It has been found that the alternating arrangement of recesses through which cool air flows and stiffeners which are locally subjected to the high temperatures of the combustion gases, leads to strong thermal fields in the trailing edge region. This induces high thermal stresses which can cause damage to the aerofoil portion in the trailing edge region.

SUMMARY OF THE INVENTION

The object of the invention is to provide a new trailing edge geometry which alleviates these drawbacks and makes it possible to lengthen the service life of the cooled blades.

To this end, according to the invention there is provided a cooled turbine blade comprising a platform and an aerofoil portion extending from said platform, said aerofoil portion having at least one internal cavity for the flow of cooling air, a leading edge, a trailing edge, first and second walls between said leading and trailing edges, and an outer edge remote from said platform and defining the tip of said blade, said first and second walls having external surfaces respectively defining a suction face and a pressure face of said aerofoil portion, and said first and second walls having internal surfaces bounding said at least one internal cavity, said second wall terminating short of said trailing edge and defining an end surface which is substantially perpendicular to said pressure face defined by said second wall, said end surface and said internal surface of said first wall defining a rebate in said aerofoil portion adjacent said trailing edge and extending from said platform to said tip of said blade, and said aerofoil portion including means defining a plurality of slots opening in said end surface for the escape of cooling air from said at least one internal cavity to said trailing edge on the pressure face side of said aerofoil portion, the slot nearest said platform opening partly in the platform, and said rebate extending into said platform facing said slot.

With this arrangement the thermal field in the region of the trailing edge is more uniform, and this area experiences much weaker thermal stresses.

Preferably, the slots are separated by small bridges which interconnect the first and second walls of the aerofoil portion.

Other preferred features and advantages of the invention will become apparent from the following description of the preferred embodiment, which is given by way of nonlimiting example and with reference to the appended drawings.

BRIEF DESCRIPTION OF THE DRAWINGS

FIG. 1 shows a perspective view of a preferred embodiment of a cooled turbine blade in accordance with the invention.

FIG. 6 shows a perspective view of a portion of the blade at the junction between the lower slot, the platform and the trailing edge.

DESCRIPTION OF THE PREFERRED EMBODIMENT

Figure 2:
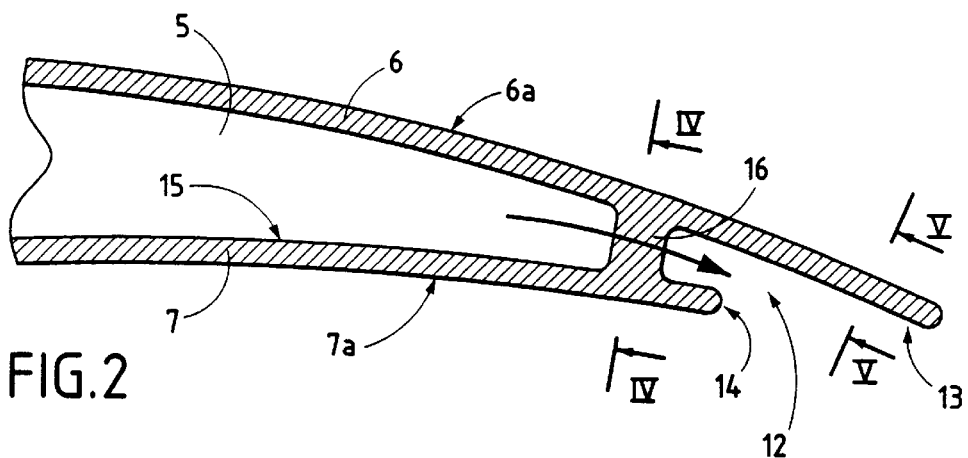
FIG. 2 is a transverse section through the trailing edge region of the aerofoil portion of the blade, taken in a plane passing between two slots.
Figure 3:
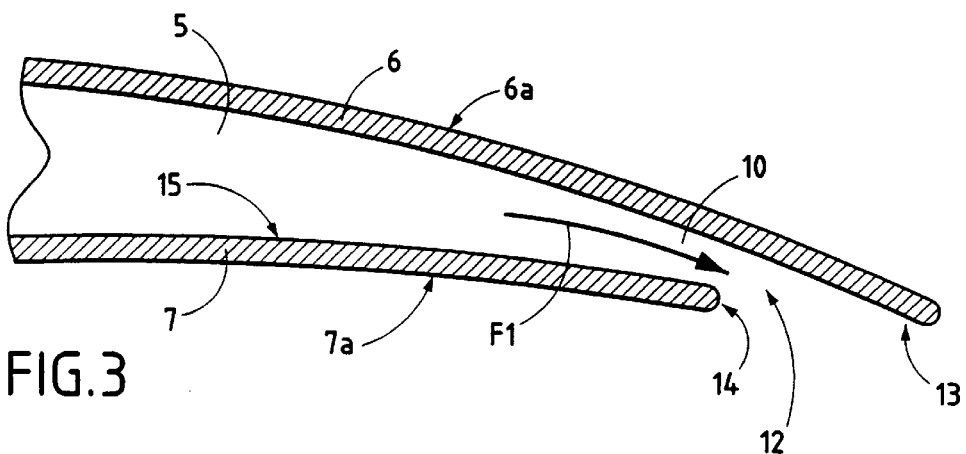
FIG. 3 is a section similar to that of FIG. 2, but taken in a plane which cuts through a slot.

In the drawings, the reference 1 has been used to depict a cooled turbine blade which comprises a platform 2 surmounting a blade root 3, and an aerofoil portion 4 which extends above the platform 2. The aerofoil portion 4 has a least one internal cavity 5 in which cooling devices are located, and is delimited by a first wall 6 forming the suction face 6a and a second wall 7 forming the pressure face 7a, the suction face and the pressure face being connected upstream by a curved leading edge 8 and meeting downstream at a trailing edge 9, upstream and downstream being defined with respect to the direction of flow of the hot gases, in operation, around the aerofoil portion 4.

In operation, some of the air F1 which flows through the internal cavity 5 near the trailing edge 9 is discharged at the trailing edge 9 and on the pressure face side 7a through a plurality of slots 10 arranged between the platform 2 and the tip 11 of the blade.

In accordance with the present invention, the second wall 7 forming the pressure face 7a does not extend as far as the trailing edge 9. Specifically, near the trailing edge 9 and on the pressure face side, there is an angular space in the form of a rebate 12 which extends between the platform 2 and the tip 11 of the blade. This rebate 12 is delimited by the interior face 13 of the first wall 6 forming the suction face 6a and by a surface 14 which is substantially perpendicular to the pressure face 7a and which forms the end face of the wall 7. The slots 10 open into this surface 14, and the air discharged through the slots 10 sweeps over the interior face 13 as far as the trailing edge 9 over the entire height of the rebate 12.

In the region of the surface 14, the interior face 15 of the second wall 7 is separated from the interior face 13 of the first wall 6 by a distance that is equal to the width of the slots 10. Between each pair of consecutive slots 10 and near the surface 14 there is a small bridge 16 which interconnects the two walls 6 and 7.

These small bridges 16 stiffen the aerofoil portion 4 in the region of the trailing edge 9.

The end portion of the first wall 6 lying in line with the rebate 12 and cooled by the air F1 leaving the slots 10, is subjected to a thermal field which is substantially uniform and for this reason is subjected to lower thermal stresses. The same is true of the second wall 7 forming the suction face 7a upstream of the surface 14.

Figure 4:
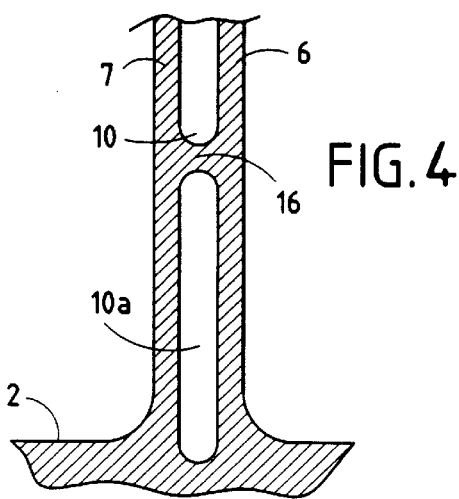
FIG. 4 is a vertical section through a portion of the blade, taken on the line IV—IV of FIG. 2.
Figure 5:
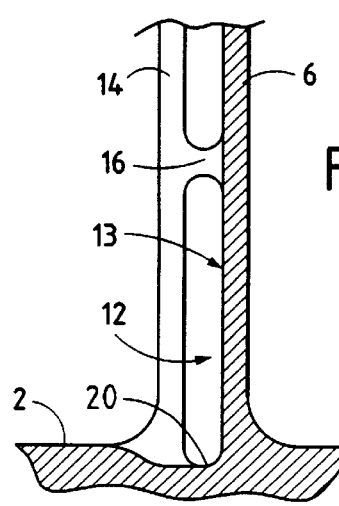
FIG. 5 is a section similar to that of FIG. 4 but taken on the line V—V of FIG. 2.

Further in accordance with the invention, the slot 10a closest to the platform 2 partly penetrates this platform, and the rebate 12 is extended into the platform 2 facing the slot 10a. This arrangement, which is shown in FIGS. 4 and 5, has the effect of improving the transmission of forces by eliminating the shape irregularity created by the first slot at the trailing edge.

The merging between the slot 10*a*, the platform 2 and the trailing edge 9 is formed in such a way as to minimize the stresses in this area. The lower region of the slot 10*a* near its mouth is in the shape of a gutter 20 which widens continuously in the downstream direction at the base of the rebate 12 and extends upwards at a gentle slope to meet the surface of the platform 2 and the interior face 13 of the first wall 6. An example of this merging is shown in FIG. 6.

What is claimed is:

1. A cooled turbine blade comprising a platform and an airfoil portion extending from said platform, said airfoil portion having at least one internal cavity for the flow of cooling air, a leading edge, a trailing edge, first and second walls between said leading and trailing edges, and an outer edge remote from said platform and defining a tip of said blade, said first and second walls having external surfaces respectively defining a suction face and a pressure face of said airfoil portion, and said first and second walls having internal surfaces bounding said at least one internal cavity, said second wall terminating short of said trailing edge and defining an end surface which is substantially perpendicular to said pressure face defined by said second wall, said end surface and said internal surface of said first wall defining a rebate in said airfoil portion adjacent said trailing edge and extending from said platform to said tip of said blade, and said airfoil portion including means defining a plurality of slots opening in said end surface for the escape of cooling air from said at least one internal cavity to said trailing edge on the pressure face side of said airfoil portion, the slot nearest said platform opening partly in the platform, and said rebate extending into said platform facing said slot.

2. A cooled turbine blade according to claim 1, wherein said slots are separated by small bridges extending between said first and second walls.

3. A cooled turbine blade according to claim 1, wherein said means defining a plurality of slots opening in said end surface provides for the escape of cooling air directly from said at least one internal cavity to said trailing edge on the pressure face side of said airfoil portion.

* * * * *